United States Patent
Benjebbour et al.

(10) Patent No.: US 10,548,162 B2
(45) Date of Patent: Jan. 28, 2020

(54) USER APPARATUS, BASE STATION, AND COMMUNICATION METHOD

(71) Applicant: NTT DOCOMO, INC., Tokyo (JP)

(72) Inventors: Anass Benjebbour, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/737,588

(22) PCT Filed: May 17, 2016

(86) PCT No.: PCT/JP2016/064587
§ 371 (c)(1),
(2) Date: Dec. 18, 2017

(87) PCT Pub. No.: WO2016/208296
PCT Pub. Date: Dec. 29, 2016

(65) Prior Publication Data
US 2018/0192435 A1    Jul. 5, 2018

(30) Foreign Application Priority Data
Jun. 24, 2015 (JP) .................. 2015-126717

(51) Int. Cl.
*H04W 72/12* (2009.01)
*H04W 72/04* (2009.01)
(Continued)

(52) U.S. Cl.
CPC ....... *H04W 72/1278* (2013.01); *H04W 52/18* (2013.01); *H04W 72/02* (2013.01); *H04W 72/08* (2013.01); *H04W 84/042* (2013.01)

(58) Field of Classification Search
CPC . H04W 72/1278; H04W 52/18; H04W 72/08; H04W 72/02; H04W 72/12; H04W 84/042
See application file for complete search history.

(56) References Cited

U.S. PATENT DOCUMENTS 9,426,753 B2    8/2016  Eriksson et al.
9,730,190 B2    8/2017  Ezaki et al.
(Continued)

FOREIGN PATENT DOCUMENTS

JP    2011-061706 A    3/2011
JP    2011-142533 A    7/2011
(Continued)

OTHER PUBLICATIONS

International Search Report of the International Searching Authority issued in PCT/JP2016/064587 dated Jun. 21, 2016 (5 pages).
(Continued)

*Primary Examiner* — Kiet Tang
(74) *Attorney, Agent, or Firm* — Osha Liang LLP

(57) ABSTRACT

A user apparatus according to an embodiment is provided. The user apparatus communicates with a base station in a wireless communication system. The user apparatus includes an obtaining unit configured to obtain resource allocation information in which downlink signal reception quality is associated with radio resources used for uplink signal transmission; a measurement unit configured to measure the downlink signal reception quality; and a transmission unit configured to determine a radio resource of the radio resources used for uplink signal transmission by comparing the resource allocation information with the measured downlink signal reception quality, and transmit an uplink signal by using the determined radio resource.

9 Claims, 14 Drawing Sheets

(51) Int. Cl.
  *H04W 52/24* (2009.01)
  *H04L 5/00* (2006.01)
  *H04L 1/00* (2006.01)
  *H04W 52/18* (2009.01)
  *H04W 72/02* (2009.01)
  *H04W 72/08* (2009.01)
  *H04W 84/04* (2009.01)

(56) References Cited

U.S. PATENT DOCUMENTS

| | | | | |
|---|---|---|---|---|
| 2012/0039244 A1* | 2/2012 | Li | ............................ | H04L 1/005 |
| | | | | 370/315 |
| 2012/0099458 A1* | 4/2012 | Ezaki | ................. | H04W 72/0406 |
| | | | | 370/252 |
| 2013/0272158 A1* | 10/2013 | Park | .................... | H04W 52/242 |
| | | | | 370/252 |
| 2013/0329596 A1* | 12/2013 | Shirakabe | ............. | H04W 16/10 |
| | | | | 370/252 |
| 2014/0161088 A1* | 6/2014 | Seo | ....................... | H04L 5/0044 |
| | | | | 370/329 |

FOREIGN PATENT DOCUMENTS

| | | |
|---|---|---|
| JP | 2013-153272 A | 8/2013 |
| JP | 2015-520971 A | 7/2015 |
| WO | 2011/007451 A1 | 1/2011 |
| WO | 2014/110728 A1 | 7/2014 |

OTHER PUBLICATIONS

Written Opinion of the International Searching Authority issued in PCT/JP2016/064587 dated Jun. 21, 2016 (5 pages).

NTT DOCOMO, Inc.; "5G Radio Access: Requirements, Concept and Technologies"; DOCOMO 5G White Paper; Jul. 2014 (13 pages).

* cited by examiner

FIG.3

| SIGNAL RECEPTION QUALITY | RADIO RESOURCE | MCS |
|---|---|---|
| 1 | a | |
| 2 | b | |
| 3 | c | |
| 4 | d | |
| 5 | e | |
| 6 | f | |
| 7 | g | |
| 8 | h | |
| 9 | i | |

FIG.6

| SIGNAL RECEPTION QUALITY | RADIO RESOURCE | MCS | TRANSMISSION POWER |
|---|---|---|---|
| 1 | a | | |
| 2 | b | | |
| 3 | c | | |
| 4 | d | | |
| 5 | e | | |
| 6 | a | | |
| 7 | b | | |
| 8 | c | | |
| 9 | d | | |
| 10 | e | | |

FIG.11

| SIGNAL RECEPTION QUALITY | RADIO RESOURCE | MCS | TRANSMISSION POWER |
|---|---|---|---|
| 1 | a | | |
| 2 | b | | |
| 3 | c | | |
| 4 | d | | |
| 5 | e | | |
| 6 | f | | |
| 7 | a | | |
| 8 | b | | |
| 9 | c | | |

USER APPARATUS, BASE STATION, AND COMMUNICATION METHOD

BACKGROUND OF THE INVENTION

1. Field of the Invention

The present invention relates to a user apparatus, a base station, and a communication method.

2. Description of the Related Art

In LTE (Long Term Evolution), various wireless technologies have been discussed in order to realize further larger system capacity, further faster data transmission speed, and further lower latency in a wireless communication section.

For example, in order to correspond to services represented by IoT (Internet of Things), element technologies have been discussed for enabling data transmission performed by an enormous number of terminals via a wireless network.

Further, in a wireless communication method referred to as "fifth generation", various element technologies have been discussed in order to meet the requirements such as a latency equal to or less than 1 ms in the wireless section while realizing a throughput equal to or greater than 10 Gbps.

CITATION LIST

Non-Patent Literature

[NPL 1] NTT DOCOMO INC., "DOCOMO 5G White Paper", September, 2014

SUMMARY OF THE INVENTION

Technical Problem

In conventional LTE, in the case where a user apparatus transmits an uplink signal to a base station eNB, it is necessary for the user apparatus to receive uplink radio resource allocation from the base station for every uplink signal transmission.

To describe more specifically, in the case where the user apparatus transmits an uplink signal to the base station eNB, first, the user apparatus transmits a control signal called "random access preamble" or a control signal called "scheduling request" to the base station in order to request the base station to allocate an uplink radio resource. Next, the user apparatus receives a UL grant (a control signal indicating an uplink radio resource) from the base station and transmits an uplink signal by using the radio resource specified by the UL grant.

As described above, in conventional LTE, many control signals are transmitted and received between a user apparatus and a base station before an uplink signal is transmitted. Therefore, as described above, there is a problem in that control signal overhead in the entire wireless network will become great in an environment in which an enormous number of terminals transmit data via a wireless network.

Further, as described above, many control signals are transmitted and received between a user apparatus and a base station before an uplink signal is transmitted, and thus, there is a problem in that delay occurs before the uplink signal transmission actually becomes available.

The present invention has been made in view of the above. It is an object to provide a technology in which it is possible to transmit an uplink signal without receiving uplink radio resource allocation for every uplink signal transmission.

Solution to Problem

A user apparatus according to an embodiment is provided. The user apparatus communicates with a base station in a wireless communication system. The user apparatus includes an obtaining unit configured to obtain resource allocation information in which downlink signal reception quality is associated with radio resources used for uplink signal transmission; a measurement unit configured to measure the downlink signal reception quality; and a transmission unit configured to determine a radio resource of the radio resources used for uplink signal transmission by comparing the resource allocation information with the measured downlink signal reception quality, and transmit an uplink signal by using the determined radio resource.

Further, a base station according to an embodiment is provided. The base station communicates with a user apparatus in a wireless communication system. The base station includes a transmission unit configured to transmit resource allocation information in which downlink signal reception quality is associated with radio resources used for uplink signal transmission; and a reception unit configured to receive an uplink signal transmitted by the user apparatus by using a predetermined radio resource of the radio resources.

Advantageous Effects of Invention

According to an embodiment, a technology is provided in which it is possible to transmit an uplink signal without receiving uplink radio resource allocation for every uplink signal transmission.

BRIEF DESCRIPTION OF THE DRAWINGS

FIG. 3 is a drawing illustrating an example of resource allocation information according to the first embodiment.

FIG. 6 is a drawing illustrating an example of resource allocation information according to the second embodiment.

FIG. 11 is a drawing illustrating an example of resource allocation information according to the third embodiment.

DETAILED DESCRIPTION OF THE PREFERRED EMBODIMENTS

Figure 1:
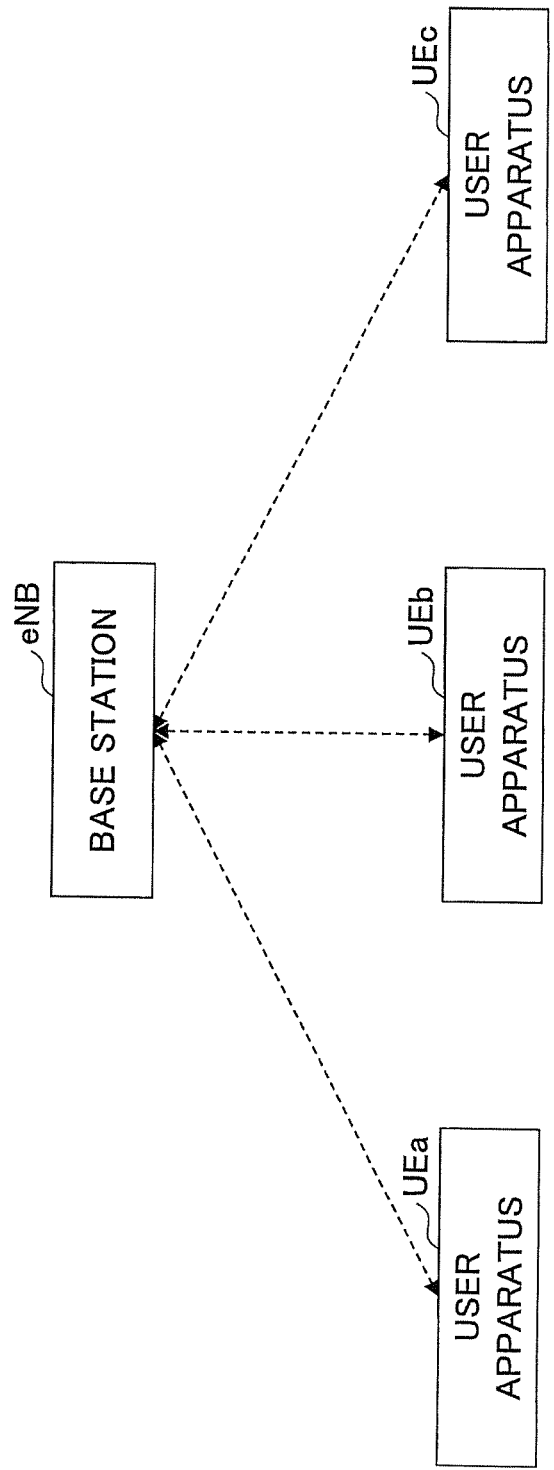
FIG. 1 is a drawing illustrating a structure of a wireless communication system according to an embodiment.

In the following, referring to the drawings, embodiments of the present invention will be described. It should be noted that the embodiments described below are merely examples and the embodiments to which the present invention is applied are not limited to the following embodiments. For example, it is assumed that a wireless communication system according to an embodiment complies with LTE standard. However, the present invention can be applied to not only to LTE, but also applied to other schemes. It should be noted that, in the application specification and claims, the term "LTE" is used, not only for meaning a communication method corresponding to 3GPP release 8 or 9, but also for including a communication method corresponding to 3GPP release 10, 11, 12, 13, or a fifth generation communication method corresponding to release 14 or later.

<Overview>

FIG. 1 is a drawing illustrating a structure of a wireless communication system according to an embodiment. As illustrated in FIG. 1, the wireless communication system includes a user apparatus UEa, a user apparatus UEb, a user apparatus UEc, and a base station eNB. Further, in an example of FIG. 1, although three user apparatuses (UEa, UEb, UEc) are shown for the sake of drawing convenience, there is no limitation for the number of user apparatuses. It should be noted that, in the following descriptions, any one of the user apparatuses (UEa, UEb, UEc) is described as "user apparatus UE". Further, in an example of FIG. 1, although a single base station eNB is shown, multiple base stations eNB may be included.

The user apparatus UE has a function for performing communications with the base station eNB, the core network, etc., via radio. The user apparatus UE may be, for example, a mobile phone, a smartphone, a tablet, a mobile router, a wearable terminal, etc. The user apparatus UE may be any apparatus as long as it has a communication function. The user apparatus UE includes hardware resources such as a CPU including a processor, a memory apparatus including a ROM, a RAM, a flash memory, etc., an antenna used for communications with the base station eNB, an RF (radio frequency) apparatus, etc. Functions and processes of the user apparatus UE may be realized by having the processor processing data or executing programs stored in the memory apparatus. However, the hardware configuration of the user apparatus UE is not limited to the above, and the user apparatus UE may have any other appropriate hardware configuration.

The base station eNB performs communications with the user apparatus UE via radio. The base station eNB includes hardware resources such as a CPU including a processor, a memory apparatus including a ROM, a RAM, a flash memory, etc., an antenna used for communications with the user apparatus UE, etc., a communication interface apparatus for communicating with an adjacent base station eNB, a core network, etc. Functions and processes of the base station eNB may be realized by having the processor processing data or executing programs stored in the memory apparatus. However, the hardware configuration of the base station eNB is not limited to the above, and the base station eNB may have any other appropriate hardware configuration.

In a wireless communication system according to an embodiment, the base station eNB transmits information in which downlink signal reception quality is associated with radio resources used for uplink signal transmission (hereinafter, referred to as "resource allocation information") to the user apparatus UE in advance by using broadcast information or an RRC (Radio Resource Control) signal, etc.

The user apparatus UE determines a radio resource used for uplink signal transmission by measuring signal reception quality of a downlink signal received from the base station eNB and comparing the resource allocation information and the signal reception quality of the received signal, and transmits an uplink signal to the base station eNB by using the determined radio resource.

With the above arrangement, in the case of transmitting an uplink signal, it is possible for the user apparatus UE to transmit an uplink signal without receiving uplink radio resource allocation from the base station for every uplink signal transmission as in conventional LTE. In the following, specific processing steps will be described while making reference to the drawings according to embodiments.

First Embodiment

<Processing Steps>

(Regarding Radio Resource Allocation Method)

A base station eNB according to a first embodiment associates radio resources used for uplink signal transmission with downlink signal reception quality semi-statically or statically in advance. The semi-statically or statically associated radio resources are reported to the user apparatus UE by using the resource allocation information.

Figure 2:
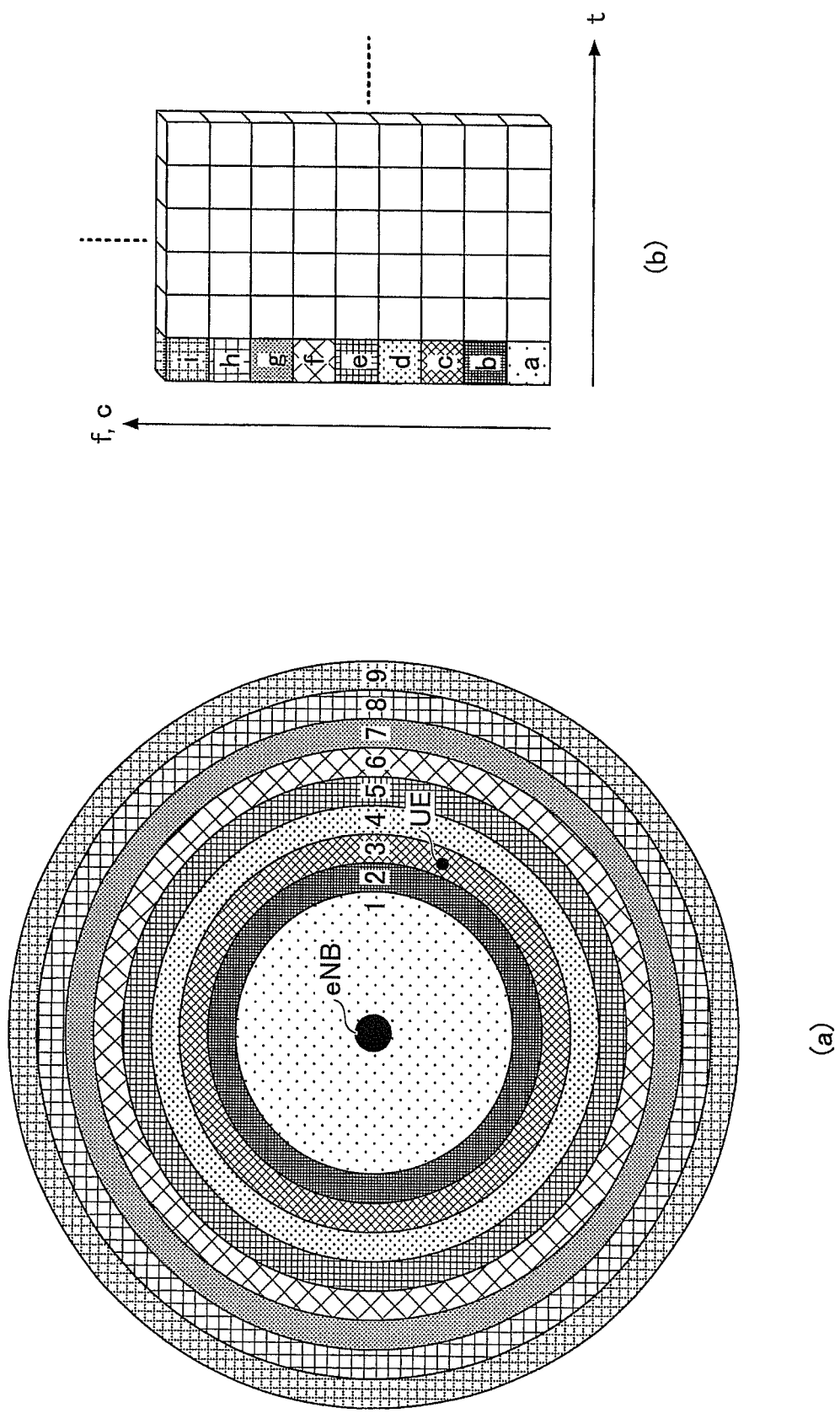
FIG. 2 is a drawing illustrating an uplink radio resource allocation method according to a first embodiment.

FIG. 2 is a drawing illustrating an uplink radio resource allocation method according to the first embodiment. FIG. 2 (a) illustrates changes in downlink signal reception quality measured by the user apparatus UE with respect to the base station eNB located in the center.

FIG. 2 (b) illustrates positions of the semi-statically or statically associated uplink radio resources. In FIG. 2 (b), horizontal axis indicates time, and vertical axis indicates frequencies or codes. In other words, FIG. 2 (b) illustrates a state in which radio resources indicated by "a" to "i" are multiplexed by using Frequency Division Multiplexing (FDM) or Code Division Multiplexing (CDM) at certain time.

FIG. 3 is a drawing illustrating an example of resource allocation information according to the first embodiment. As illustrated in FIG. 3, the resource allocation information includes downlink signal reception quality, and radio resources and MCS (Modulation and Coding Scheme) associated with the downlink signal reception quality. It should be noted that numbers "1" to "9" indicated in the "signal reception quality" in FIG. 3 correspond to "1" to "9" indicated in FIG. 2 (a), respectively. Further, "a" to "i" indicated in the "radio resource" in FIG. 3 correspond to "a" to "i" indicated in FIG. 2 (b), respectively.

In general, the downlink signal reception quality measured by a user apparatus UE is decreased as a distance between the base station eNB and the user apparatus UE is increased. Therefore, according to the first embodiment, the downlink signal reception quality is divided into multiple ranges, and each of the divided multiple ranges is associated with a predetermined uplink radio resource. The user apparatus UE determines which range the measured downlink signal quality belongs to, and determines an uplink radio resource by searching the resource allocation information for the radio resource corresponding to the determined range.

Specific descriptions will be provided by using an example case. For example, the signal reception quality is path-loss of a downlink signal, and the path-loss of the downlink signal is divided into 5 dB ranges. In other words, a range "1" in FIG. 2 (a) is path-loss from 0 dB to 5 dB, a range "2" is path-loss from 5 dB to 10 dB, and a range "3" is path-loss from 10 dB to 15 dB.

In this case, for example, in the case where the downlink signal path-loss measured by the user apparatus UE is 13 dB, the user apparatus UE determines that the signal reception quality (path-loss) belongs to a range indicated by "3". Next, the user apparatus UE refers to the resource allocation information. In FIG. 3, in the case where the signal reception quality (path-loss) belongs to "3", the radio resource is "c". Therefore, it is possible for the user apparatus UE to determine that the radio resource to be used for uplink signal transmission is a radio resource "c".

(Processing Sequence)

Figure 4:
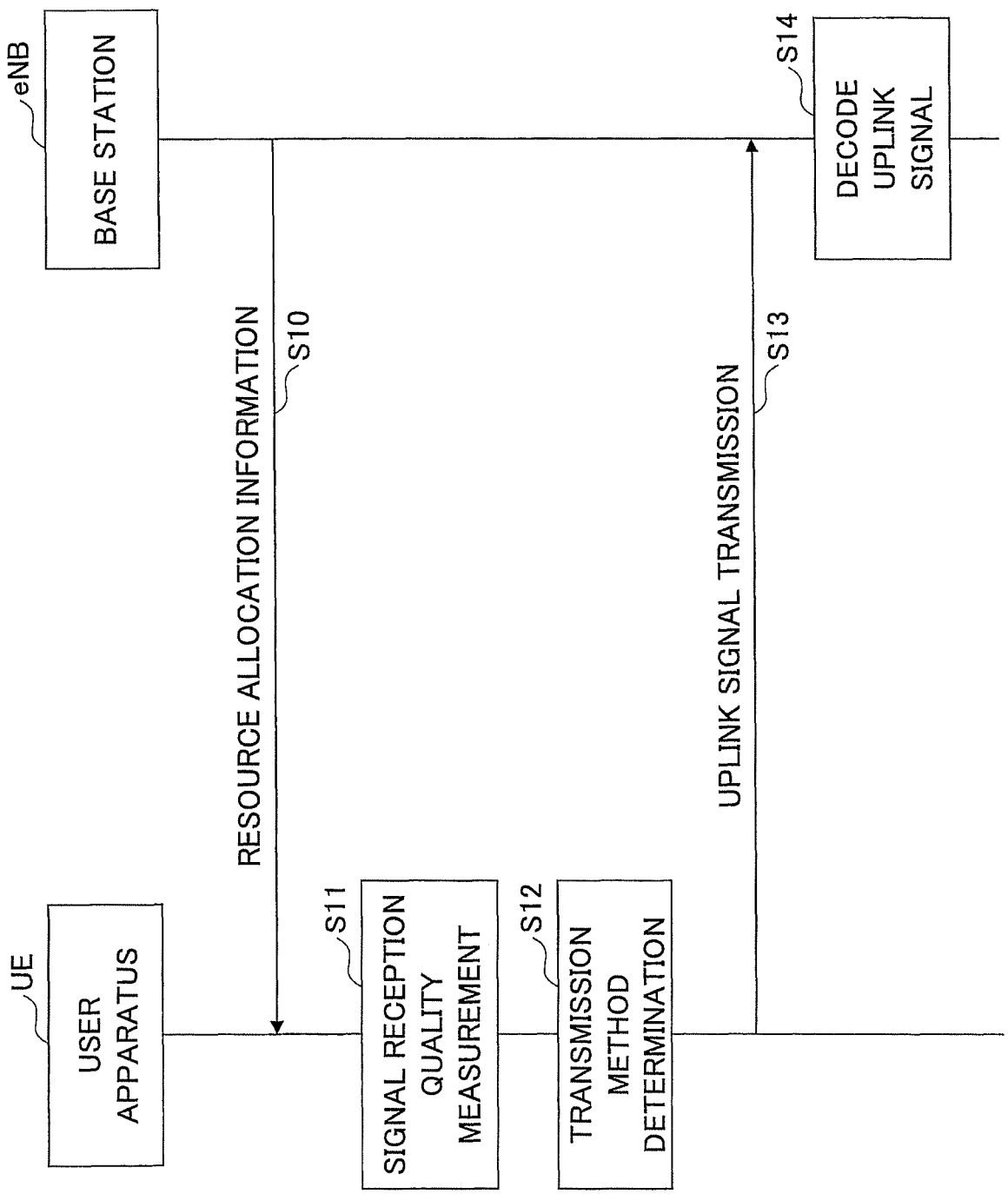
FIG. 4 is a sequence diagram illustrating an example of processing steps according to the first embodiment.

FIG. 4 is a sequence diagram illustrating an example of processing steps according to the first embodiment. Referring to FIG. 4, processing steps will be described from a step in which resource allocation information is transmitted from a base station eNB to a user apparatus UE to a step in which the base station eNB decodes an uplink signal transmitted from the user apparatus UE.

In step S10, the base station eNB transmits the resource allocation information. It should be noted that, for example, the base station eNB may include the resource allocation information in broadcast information (SIB: System Information Block) and transmit the included result to the user apparatus UE, or may transmit the resource allocation information to the user apparatus UE by using an RRC signal.

In step S11, the user apparatus UE measures downlink signal reception quality. The user apparatus UE may measure the downlink signal reception quality by using, for example, a predetermined reference signal (RS) transmitted from the base station eNB. The predetermined reference signal may be, for example, a CRS (Cell Specific Reference Signal), a UE-specific RS, or a CSI (Channel State Information)-RS. Further, the predetermined reference signal is not limited to the above, but may be another reference signal or a physical channel signal.

In step S12, the user apparatus UE determines which range the measured downlink signal quality belongs to, and determines an uplink radio resource and an MCS by searching the resource allocation information for the radio resource and the MCS corresponding to the determined range.

In step S13, the user apparatus UE performs coding and modulation of an uplink signal to be transmitted to the base station eNB according to the MCS determined in step S12, and transmits the uplink signal by using the radio resource determined in step S12.

In step S14, the base station eNB obtains the uplink signal transmitted from the user apparatus UE by decoding each of the uplink signal radio resources specified by the resource allocation information (radio resources "a" to "i" in an example of FIG. 2) according to the MCS corresponding to the radio resource, and performs processing (upper layer process, etc.) as necessary.

It should be noted that, according to an embodiment, the base station eNB cannot obtain at which timing the user apparatus UE is to transmit an uplink signal in advance because the base station eNB does not transmit a UL grant to the user apparatus UE as a base station eNB does in conventional LTE. Therefore, for example, the base station eNB may always or intermittently (discontinuously) try to decode each of the uplink radio resources specified by the resource allocation information according to an MCS corresponding to the radio resource. Further, for example, the base station eNB may estimate a traffic amount from the number of user apparatuses UE residing in a cell formed by the base station eNB, UE categories, etc., and may determine whether the base station eNB tries to decode each of the uplink radio resources always or intermittently according to the estimated traffic amount.

Supplementary Description Related to First Embodiment

The signal reception quality measured by the user apparatus UE and the signal reception quality associated with each of the radio resources in the resource allocation information are not limited to the above-described path-loss, and may be RSRQ (Reference Signal Received Quality), RSSI (Received Signal Strength Indicator), RSRP (Reference Signal Received Power), or CQI (Channel Quality Indicator). Further, the signal reception quality may be a combination of a plurality of the above.

Further, the resource allocation information may include specific value ranges of the signal reception quality. For example, the signal reception quality of the resource allocation information illustrated in FIG. 3 may include values of specific signal reception quality ranges associated with corresponding radio resources. For example, the signal reception quality of the resource allocation information may include specific values such as "0 dB to 5 dB", "5 dB to 10 dB", "10 dB to 15 dB", or the like.

The base station eNB may change the resource allocation information according to a degree of congestion of uplink radio resources (traffic status) as necessary. For example, the base station eNB may estimate a degree of congestion of the uplink radio resources from the number of user apparatuses UE residing in a cell formed by the base station eNB and/or UE categories, and may change the uplink radio resource allocation corresponding to each signal reception quality according to the estimated degree of congestion. Further, as opposed to changing the corresponding uplink radio resource allocation, the signal reception quality ranges corresponding to each radio resource may be changed. Further, the base station eNB may estimate a degree of congestion of the uplink radio resources from the actual traffic amount of uplink signals transmitted by using the uplink radio resources. With the above arrangement, it is possible to distribute the radio resources used for uplink signal transmission according to the traffic status, and thus, it is possible to increase uplink signal communication probability (to reduce collision probability of uplink signals transmitted by multiple user apparatuses UE).

Further, in the case where the resource allocation is changed, the base station eNB may include the changed resource allocation information in the broadcast information (SIB) and transmit the included result to the user apparatus UE, and the base station eNB may report to the user apparatus that the broadcast information has been changed by transmitting "SI modification" to the user apparatus UE by using a paging message. Further, the base station eNB may individually transmit the changed resource allocation information to each user apparatus by using an RRC signal.

Further, in the case where an uplink signal transmitted by the user apparatus UE collides with an uplink signal transmitted by another user apparatus UE, the user apparatus UE may retransmit the uplink signal. The user apparatus UE may determine that the uplink signals have collided with each other in the case where, for example, the user apparatus UE cannot receive a response signal (e.g., an ACK/NACK in HARQ (Hybrid Automatic ReQuest), an ACK/NACK in an RLC (Radio Link Control) layer, an ACK in TCP, or the like) for the uplink signal. It should be noted that the base station eNB may include a retransmission timing of the uplink signal in the resource allocation information and transmit the included result to the user apparatus UE, or may transmit the retransmission timing by using another broadcast information (SIB).

Further, each of the radio resources (radio resources indicated by "a" to "i") illustrated in FIG. 2 (b) may include one or more PRBs (Physical Resource Blocks), or may include one or more OFDM symbols.

Further, each of the radio resources (radio resources indicated by "a" to "i") illustrated in FIG. 2 (b) may be further divided into multiple resources. For example, the resource "a" in FIG. 2 (b) may be further divided into multiple radio resources. In this case, the user apparatus UE may randomly select a radio resource, from the multiple radio resources, to be used for transmitting an uplink signal, and may transmit the uplink signal to the base station eNB by using the selected radio resource. With the above arrangement, in the case where there exist multiple user apparatuses UE that transmit an uplink signal to the base station eNB by using the radio resource indicated by "a", it is possible to further reduce uplink signal collision probability. It should be noted that, in this case, the base station eNB obtains an uplink signal transmitted from the user apparatus UE by decoding each of the multiple radio resources, and performs necessary processing (upper layer processing, etc.)

Further, the radio resources associated with corresponding signal reception quality may be distributed in the time axis direction. In FIG. 2 (b), the radio resources are multiplexed in the same time with respect to the time axis. However, the radio resources associated with corresponding signal reception quality may correspond to radio resources of different times with respect to the time axis of a predetermined frequency or code.

It should be noted that the dividing number of the downlink signal reception quality and the uplink radio resources illustrated in FIG. 2 and FIG. 3 is only an example. There is no limitation to the dividing number.

Second Embodiment

Next, a second embodiment will be described while making reference to the drawings. It should be noted that the points that are not specifically described may be the same as the first embodiment.

<Processing Steps>

(Radio Resource Allocation Method and Uplink Signal Transmission Method)

In the first embodiment, a single downlink signal reception quality value is associated with a radio resource used for uplink signal transmission. However, in a second embodiment, multiple downlink signal reception quality values will be associated with a radio resource used for uplink signal transmission by using a technology called NOMA (Non Orthogonal Multiple Access). It should be noted that NOMA is a technology in which multiple radio signals are multiplexed by using power domain into the same radio resource, and Multi-user Detection (MUD) processing is performed by a reception side in order to separate signals from multiple users. By using NOMA, it is possible to separate multiple radio signals by using power differences in the multiple radio signals, and it is possible to improve frequency utilization efficiency per radio resource. It should be noted that it is possible for the reception side to use, for example, MLD (Maximum Likelihood Detection) or SIC (Successive Interference Cancellation) as the Multi-user Detection (MUD) processing.

Figure 5:
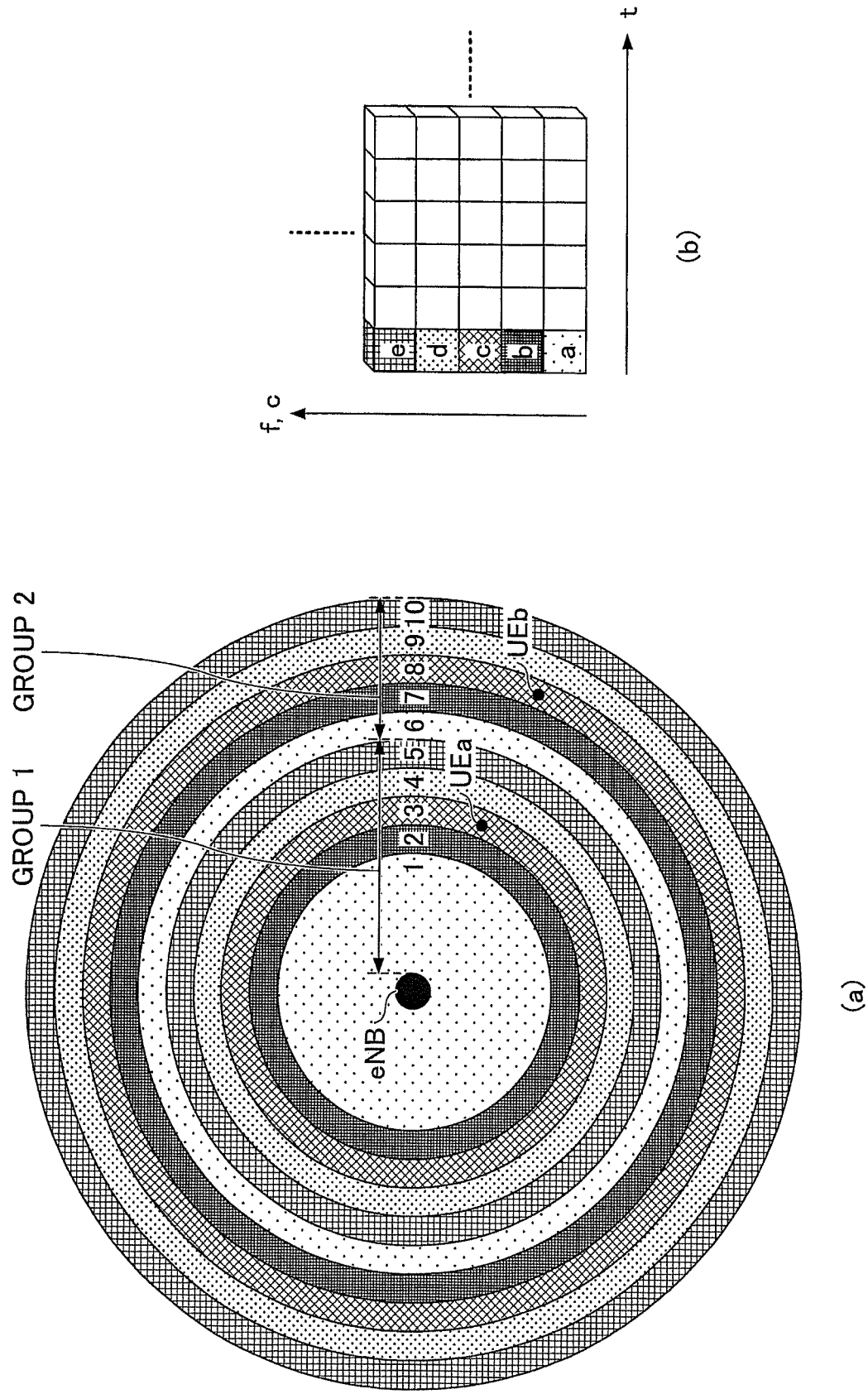
FIG. 5 is a drawing illustrating an uplink radio resource allocation method according to a second embodiment.

FIG. 5 is a drawing illustrating an uplink radio resource allocation method according to the second embodiment. FIG. 5 (a) illustrates changes in downlink signal reception quality measured by the user apparatus UE with respect to the base station eNB located in the center. Further, as illustrated in FIG. 5 (a), for example, a range corresponding to downlink signal reception quality "1" to "5" is referred to as "group 1", and a range corresponding to downlink signal reception quality "6" to "10" is referred to as "group 2".

FIG. 5 (b) illustrates positions of the semi-statically or statically associated uplink radio resources. In FIG. 5 (b), the horizontal axis indicates time, and the vertical axis indicates frequencies or codes. In other words, FIG. 5 (b) illustrates a state in which radio resources indicated by "a" to "e" are multiplexed by using Frequency Division Multiplexing (FDM) or Code Division Multiplexing (CDM) at a certain time.

FIG. 6 is a drawing illustrating an example of resource allocation information according to the second embodiment. As illustrated in FIG. 6, the resource allocation information includes signal reception quality, a radio resource, an MCS, and transmission power associated with each signal reception quality. It should be noted that numbers "1" to "10" indicated in the "signal reception quality" in FIG. 6 correspond to "1" to "10" indicated in FIG. 5 (a), respectively. Further, to "e" indicated in the "radio resource" in FIG. 6 correspond to "a" to "e" indicated in FIG. 5 (b), respectively.

In the second embodiment, an uplink radio resource is shared between multiple groups. For example, as illustrated in FIG. 5, a user apparatus UEa, which is located in a range (group 1) in which downlink signal reception quality is "3", and a user apparatus UEb, which is located in a range (group 2) in which downlink signal reception quality is "8", transmit an uplink signal by using the same radio resource indicated by "c"

Further, a base station eNB according to the second embodiment separates radio signals from multiple user apparatuses UE transmitted by using the same radio resource by using power differences according to the above-described Multi-user Detection (MUD) processing. Therefore, in order to allow the base station eNB to separate radio signals multiplexed in the power domain by using the Multi-user Detection (MUD) processing, the user apparatus UE transmits an uplink signal according to "transmission power" included in the resource allocation information.

(Regarding Processing Sequence)

Figure 7:
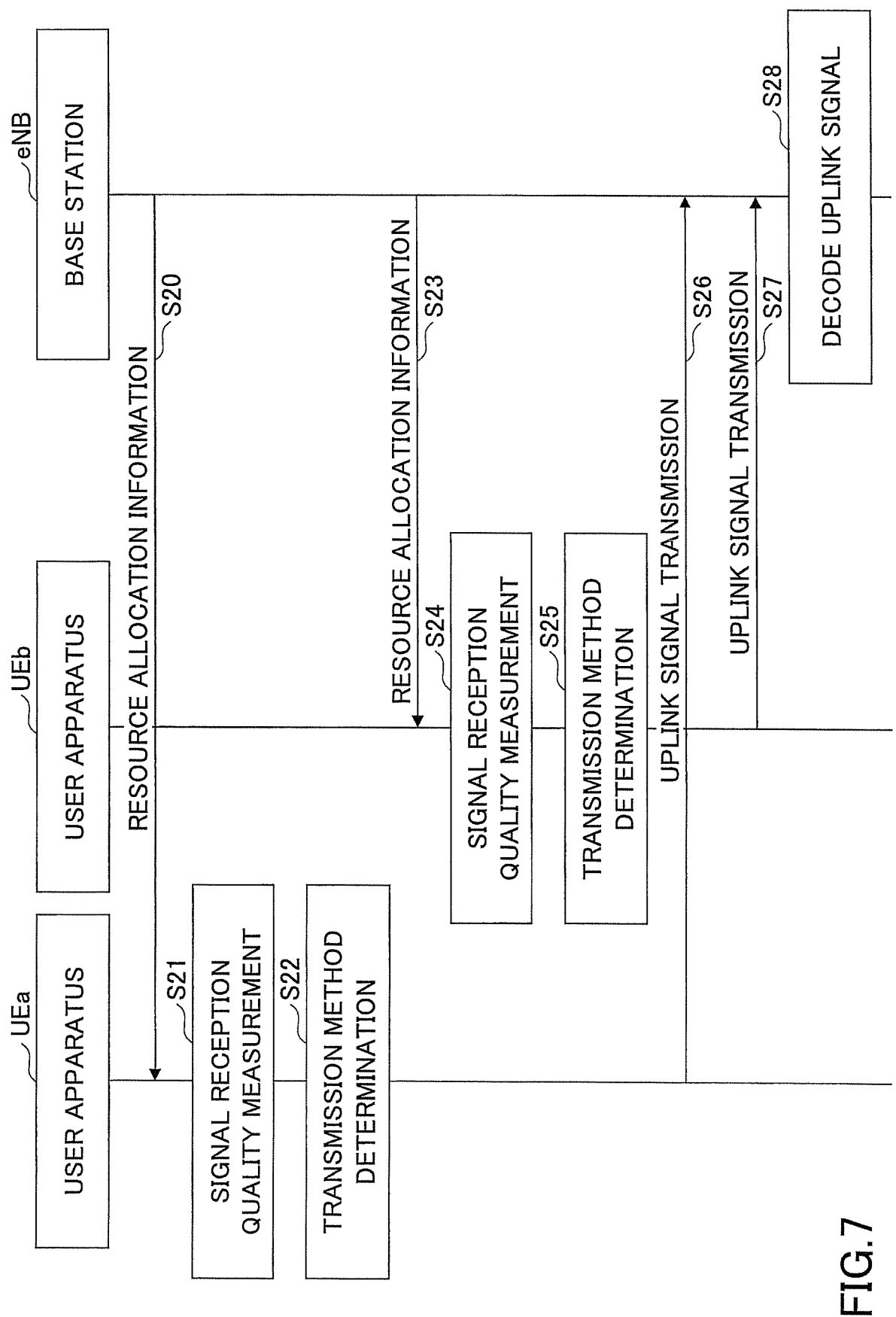
FIG. 7 is a sequence diagram illustrating an example of processing steps according to the second embodiment.

FIG. 7 is a sequence diagram illustrating an example of processing steps according to the second embodiment. Referring to FIG. 7, processing steps will be described from a step in which resource allocation information is transmitted to a user apparatus UEa and a user apparatus UEb to a step in which the base station eNB decodes uplink signals transmitted from the user apparatus UEa and the user apparatus UEb.

The processing steps of S20 and S21 are the same as those of S10 and S11 in FIG. 4, respectively, and thus, the description will be omitted.

In step S22, the user apparatus UEa determines which range the measured downlink signal reception quality belongs to, and determines a radio resource used for uplink signal transmission, MCS, and transmission power by searching the resource allocation information for the radio resource, MCS, and transmission power corresponding to the range.

The processing steps of S23 and S24 are the same as those of S10 and S11 in FIG. 4, respectively, and thus, the description will be omitted.

In step S25, the user apparatus UEb determines which range the measured downlink signal reception quality belongs to, and determines a radio resource used for uplink signal transmission, MCS, and transmission power by searching the resource allocation information for the radio resource, MCS, and transmission power corresponding to the range.

In step S26, the user apparatus UEa performs coding and modulation of an uplink signal to be transmitted to the base station eNB according to the MCS determined in step S22, and transmits the uplink signal by using the radio resource and the transmission power determined in step S22.

In step S27, the user apparatus UEb performs coding and modulation of an uplink signal to be transmitted to the base station eNB according to the MCS determined in step S25, and transmits the uplink signal by using the radio resource and the transmission power determined in step S25.

In step S28, the base station eNB obtains each of the uplink signals transmitted from the user apparatus UEa and the user apparatus UEb by decoding the uplink signals transmitted by using radio resources (radio resources "a" to "e" in an example of FIG. 5) specified by the resource allocation information according to the MCSs corresponding to the radio resources and by using the Multi-user Detection (MUD) processing, and performs processing (upper layer process, etc.) as necessary. Here, the processing performed by the base station eNB in step S28 will be specifically described with respect to the case where SIC is used as the Multi-user Detection processing.

Figure 8:
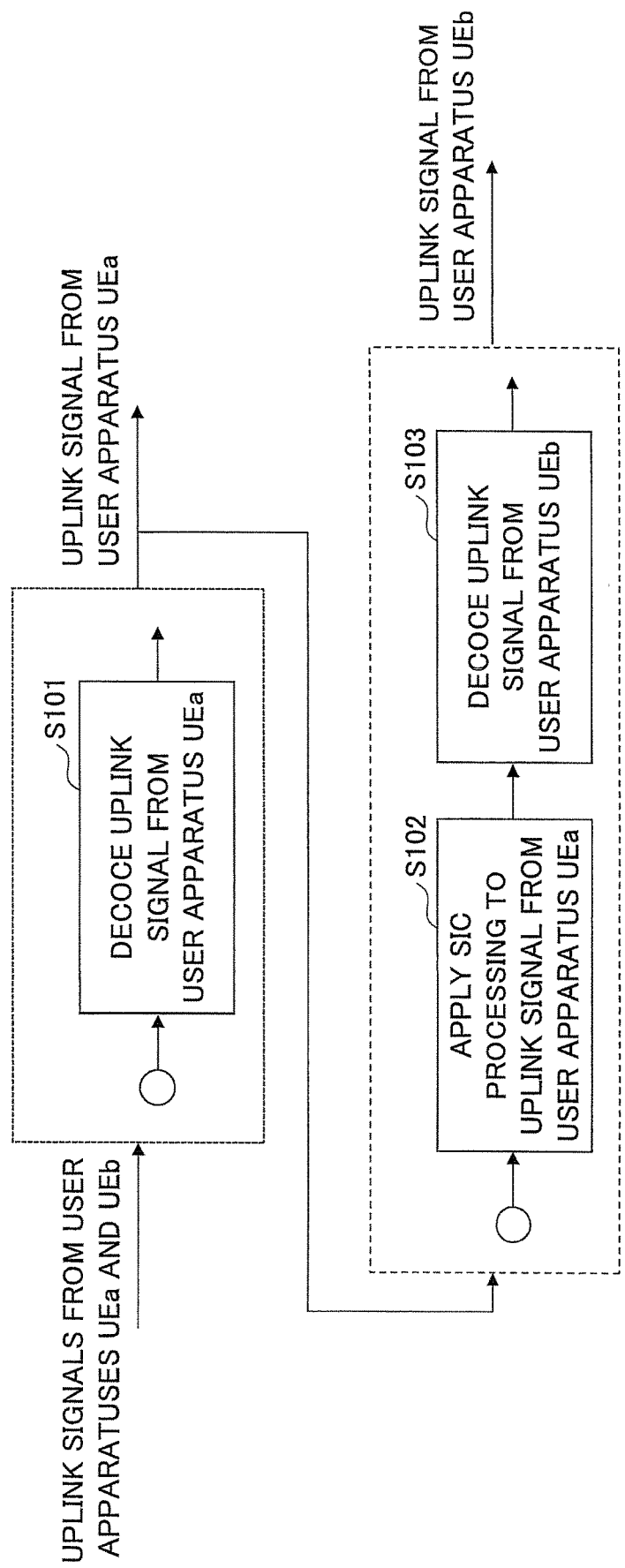
FIG. 8 is a drawing illustrating processing steps when decoding an uplink signal by using SIC.

FIG. 8 is a drawing illustrating processing steps when decoding uplink signals by using SIC. The base station eNB performs processing steps illustrated in FIG. 8 for each of the uplink signals received in the uplink radio resources specified in the resource allocation information (radio resources "a" to "e" in an example of FIG. 5).

In step S101, the base station eNB decodes a received uplink signal. In the processing steps in S101, of an uplink signal transmitted from the user apparatus UEa and an uplink signal transmitted from the user apparatus UEb, an uplink signal from a user apparatus UE, reception power of which signal is greater, is decoded. Here, it is assumed that an uplink signal from the user apparatus UEa is decoded.

In step S102, the base station eNB generates a replica signal of the uplink signal decoded in step S101. Next, the base station eNB removes (cancels) the uplink signal from the user apparatus UEa from the uplink signals received in step S101 by using the generated replica signal, and extracts (obtains) an uplink signal from the user apparatus UEb.

In step S103, the base station eNB decodes the extracted uplink signal from the user apparatus UEb.

Modified Example of the Second Embodiment

Figure 9:
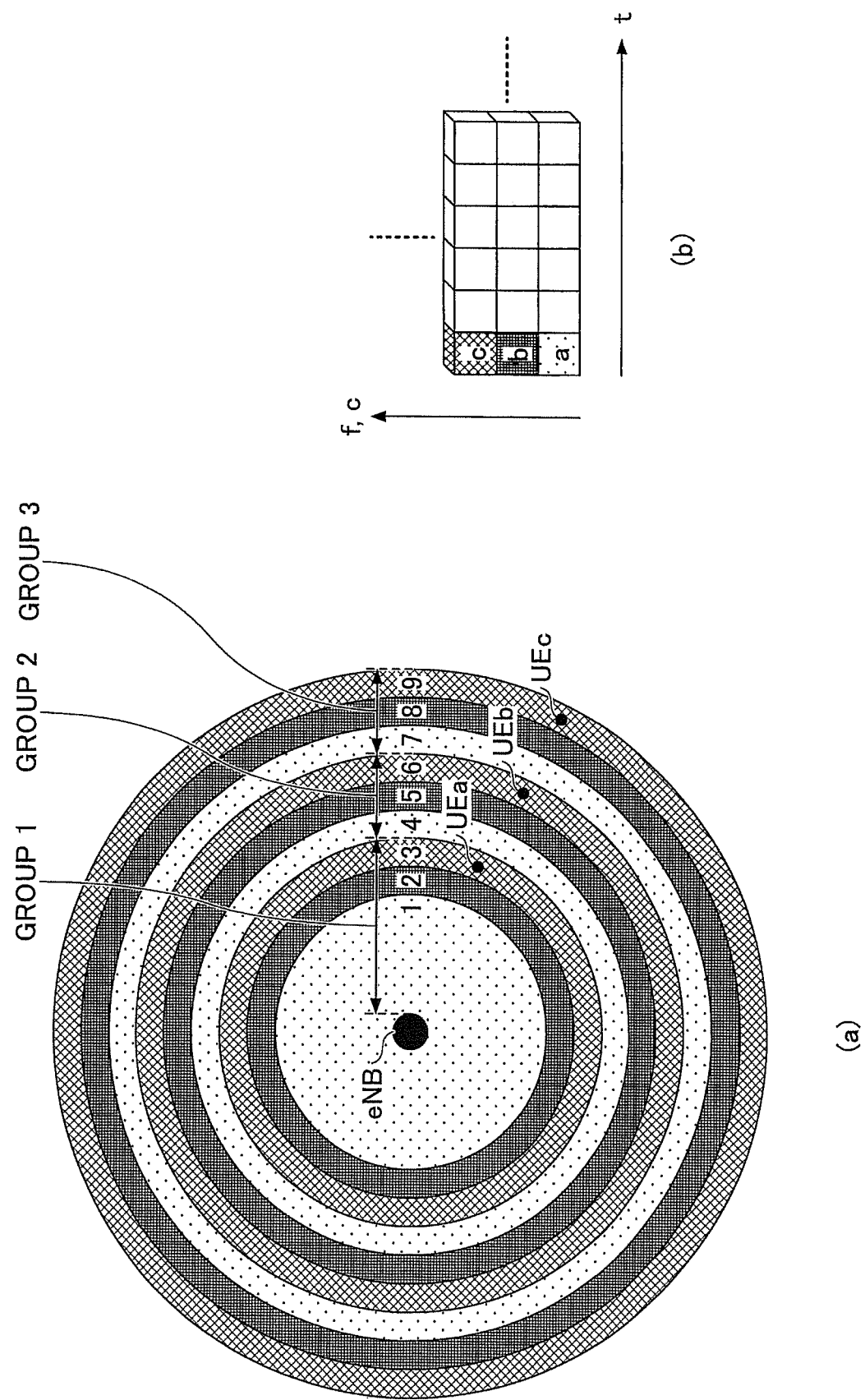
FIG. 9 is a drawing illustrating an uplink radio resource allocation method (modified example) according to the second embodiment.

In an example illustrated in FIG. 5, the ranges of downlink signal reception quality are grouped into two groups, the group 1 and the group 2. However, as illustrated in FIG. 9 (*a*), the ranges of downlink signal reception quality may be grouped into three groups, a group 1, a group 2, and a group 3, and the radio resources may be associated with the groups in an overlapping manner. For example, as illustrated in FIG. 9 (*a*), in the case where the downlink signal reception quality is "1", "4", and "7", a radio resource "a" in FIG. 9 (*b*) may be associated with the downlink signal reception quality "1", "4", and "7". In the case where the downlink signal reception quality is "2", "5", and "8", a radio resource "b" in FIG. 9 (*b*) may be associated with the downlink signal reception quality "2", "5", and "8". In the case where the downlink signal reception quality is "3", "6", and "9", a radio resource "c" in FIG. 9 (*b*) may be associated with the downlink signal reception quality "3", "6", and "9". With the above arrangement, it is possible to further increase frequency utilization efficiency of uplink radio resources.

It should be noted that the ranges of the downlink signal reception quality are divided into three groups in an example of FIG. 9 (*a*). However, the ranges of the downlink signal reception quality may be divided into further more groups.

Supplementary Description Related to the Second Embodiment

An idea may be considered in which, for example, the same value (transmission power) is set in each "transmission power" included in the resource allocation information, and thus, there is a difference generated between reception powers when uplink signals arrive at the base station eNB. However, the path-loss of an uplink signal depends on an actual environment. Therefore, it may be desirable that a value set in each "transmission power" included in the resource allocation information may be determined by performing tuning according to an actual environment as necessary.

In the second embodiment, uplink signal transmission power is determined by "transmission power" included in the resource allocation information. However, the uplink signal transmission power may be determined by another method as long as there is a difference generated between reception powers when uplink signals, transmitted by multiple user apparatuses UE, arrive at the base station eNB. For example, the user apparatus UE may determine the transmission power according to a predetermined formula by using signal reception quality measured in the processing steps of S21 or S24, and an MCS determined in the processing steps of S22 or S25. In this case, it is not necessary to include "transmission power" in the resource allocation information, and thus, an amount of signals (broadcast information, RRC signal, etc.) used for transmitting resource allocation information from the base station eNB to the user apparatus UE can be reduced.

Third Embodiment

Next, a third embodiment will be described while making reference to the drawings. It should be noted that the points that are not specifically described may be the same as the first embodiment or the second embodiment.

<Processing Steps>
(Regarding Radio Resource Allocation Method and Uplink Signal Transmission Method)

In the second embodiment, multiple downlink signal reception quality values are associated with all of the radio resources used for uplink signal transmission. However, in a third embodiment, regarding the downlink signal reception quality values in some ranges, similar to the first embodiment, a single downlink signal reception quality value is associated with a radio resource used for uplink signal transmission.

Figure 10:
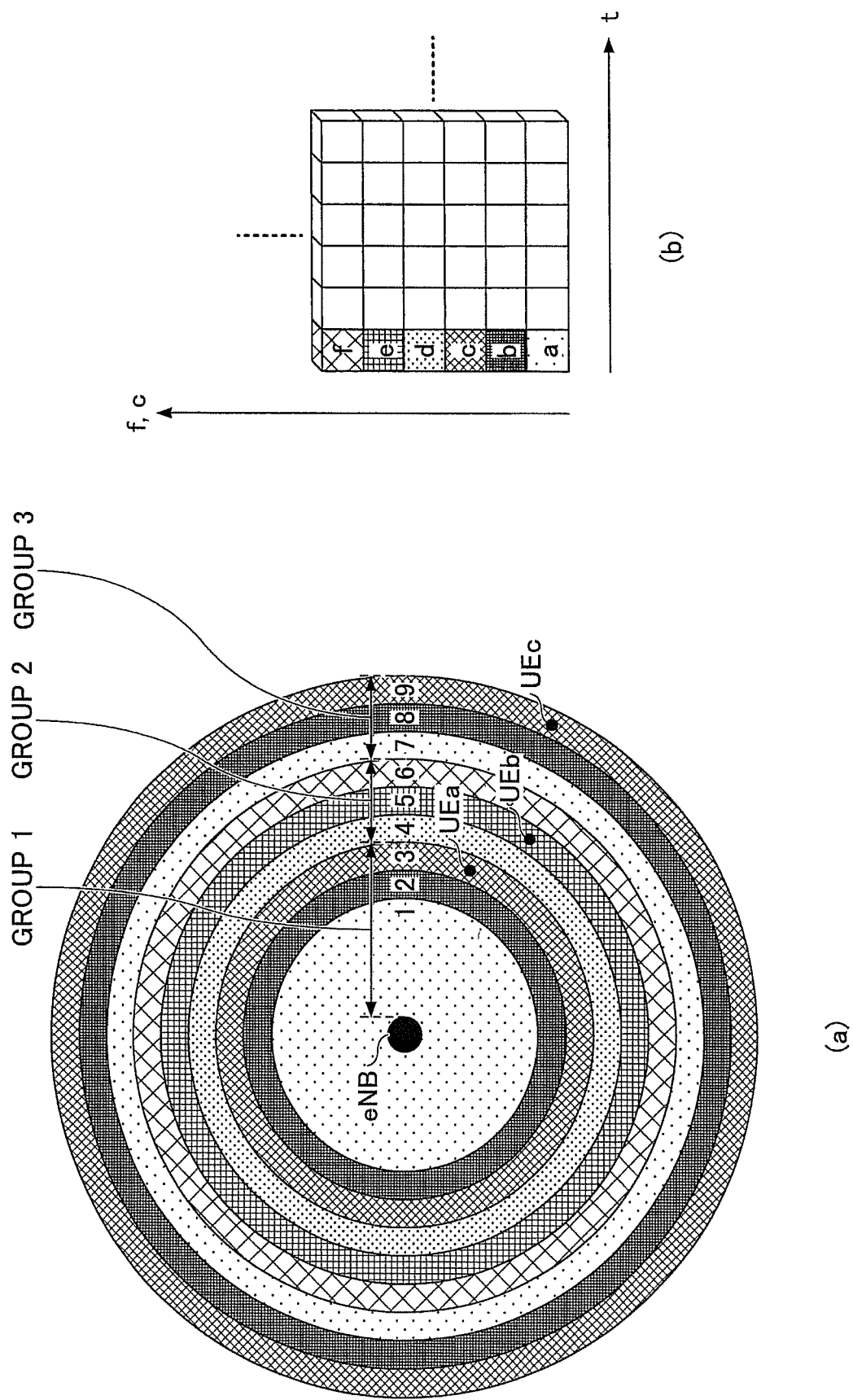
FIG. 10 is a drawing illustrating an uplink radio resource allocation method according to a third embodiment.

FIG. 10 is a drawing illustrating an uplink radio resource allocation method according to the third embodiment. FIG. 10 (a) illustrates changes in downlink signal reception quality measured by the user apparatus UE with respect to the base station located in the center. Further, as illustrated in FIG. 10 (a), for example, a range corresponding to downlink signal reception quality "1" to "3" is referred to as "group 1", a range corresponding to downlink signal reception quality "4" to "6" is referred to as "group 2", and a range corresponding to downlink signal reception quality "7" to "9" is referred to as "group 3"

FIG. 10 (b) illustrates positions of semi-statically associated or statically associated uplink radio resources. In FIG. 10 (b), the horizontal axis indicates time, and the vertical axis indicates frequencies or codes. In other words, FIG. 10 (b) illustrates a state in which radio resources indicated by "a" to "f" are multiplexed by using Frequency Division Multiplexing (FDM) or Code Division Multiplexing (CDM) at a certain time.

FIG. 11 is a drawing illustrating an example of resource allocation information according to the third embodiment. As illustrated in FIG. 11, the resource allocation information includes signal reception quality, and radio resources, MCS, and transmission power associated with each signal reception quality. It should be noted that numbers "1" to "9" indicated in the "signal reception quality" in FIG. 11 correspond to "1" to "9" indicated in FIG. 10 (a), respectively. Further, "a" to "f" indicated in the "radio resource" in FIG. 11 correspond to "a" to "f" indicated in FIG. 10 (b), respectively.

In the third embodiment, an uplink radio resource is shared between multiple groups whose signal reception quality difference is great. For example, as illustrated in FIG. 10, a user apparatus UEa, which is located in a range (group 1) in which downlink signal reception quality is "3", and a user apparatus UEc, which is located in a range (group 3) in which downlink signal reception quality is "9", each transmit an uplink signal by using the same radio resource indicated by "c". Further, a user apparatus UEb, which is located in a range (group 2) in which downlink signal reception quality is "5", transmits an uplink signal by using a radio resource indicated by "e".

According to the third embodiment, by combining groups so as to make a signal reception quality difference of the groups great, in the case where multiple uplink signals are multiplexed in the same radio resource by using power domain, it is possible to make a difference between uplink signals received by the base station eNB great.

Supplementary Description Related to the Third Embodiment

In the third embodiment, the resource allocation information may not include "transmission power". In this case, the user apparatus UE may determine the transmission power according to a predetermined formula by using the measured signal reception quality and determined MCS. Further, when determining the transmission power according to the predetermined formula, the user apparatus UE may change uplink transmission power according to whether a radio resource for uplink signal transmission is associated with multiple signal reception quality values (in other words, whether NOMA is applied to the radio resources). In an example of FIG. 10, the user apparatus UE may change the uplink signal transmission power depending on whether the signal reception quality is "1" to "3", and "7" to "9", or the signal reception quality is "4" to "6". Further, the resource allocation information may include a flag indicating whether NOMA is applied to the radio resources. Further, the user apparatus UE may change the uplink signal transmission power by referring to the flag.

<Functional Structure>

Functional structures of a base station eNB and a user apparatus UE according to the above-described embodiments will be described while making reference to the drawings.

(Base Station)

Figure 12:
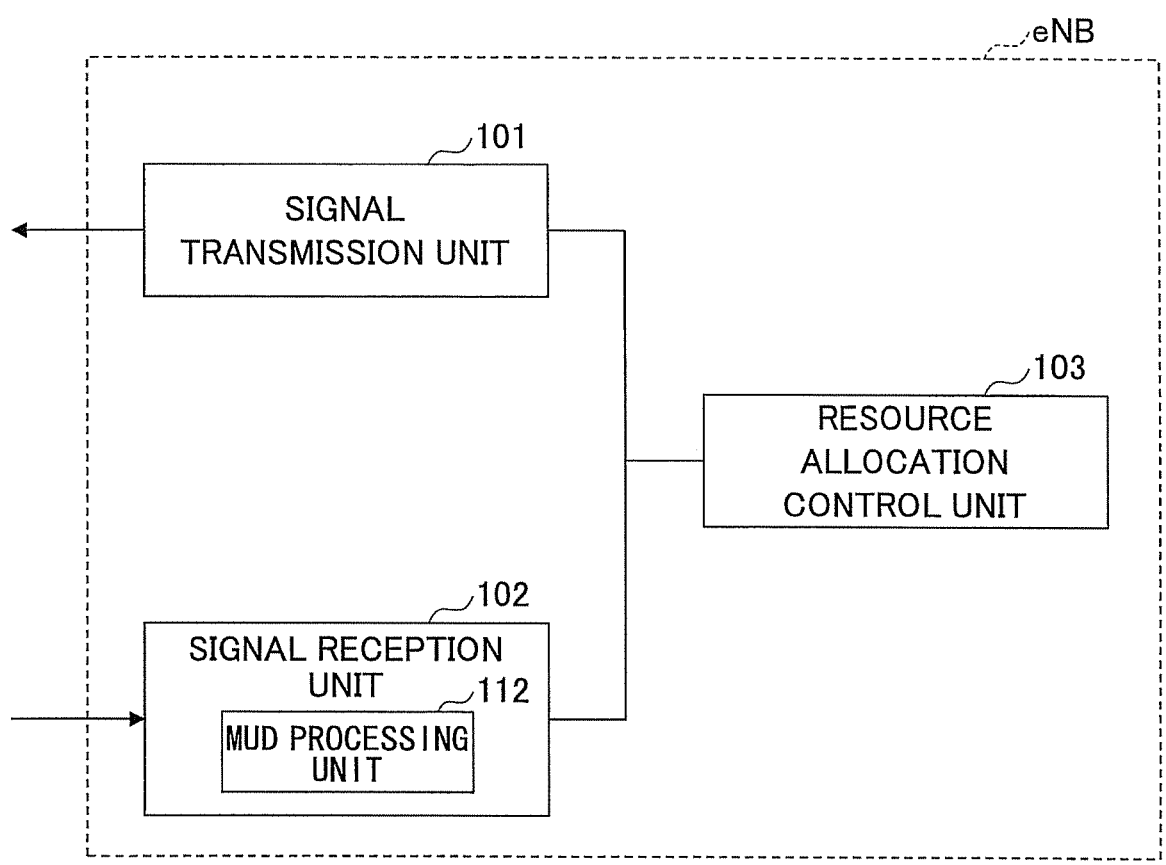
FIG. 12 is a drawing illustrating an example of a functional structure of a base station according to an embodiment.

FIG. 12 is a drawing illustrating an example of a functional structure of a base station eNB according to an embodiment. As illustrated in FIG. 12, the base station eNB includes a signal transmission unit 101, a signal reception unit 102, and a resource allocation control unit 103. Further, the signal reception unit 102 includes an MUD processing unit 112. It should be noted that FIG. 12 illustrates functional units of the base station eNB especially related to an embodiment only, and thus, the base station eNB further includes at least functions for performing operations according to LTE (not shown in the figure). Further, a functional structure illustrated in FIG. 12 is only an example. Functional classification and names of functional units may be anything as long as operations related to an embodiment can be performed.

The signal transmission unit 101 includes a function for wirelessly transmitting various kinds of physical layer signals generated from an upper layer signal which should be transmitted from the base station eNB. Further, the signal transmission unit 101 transmits resource allocation information received from the resource allocation control unit 103 to the user apparatus UE. It should be noted that the signal transmission unit 101 may transmit the resource allocation information to the user apparatus UE by using broadcast information or an RRC signal.

The signal reception unit 102 includes a function for wirelessly receiving various kinds of signals from the user apparatus UE, and obtaining upper layer signals from the received physical layer signals.

The resource allocation control unit 103 controls radio resources used for uplink signal transmission by generating the resource allocation information and transmitting the generated resource allocation information to the signal transmission unit 101. Further, the resource allocation control unit 103 may change the resource allocation information based on the traffic status in the base station eNB.

In the case where uplink signals from multiple user apparatuses are multiplexed in the radio resource, the MUD processing unit 112 decodes each of the uplink signals transmitted from the multiple user apparatuses according to the Multi-user Detection processing. It should be noted that the MUD processing unit 112 may use MLD or SIC as the Multi-user Detection processing.

(User Apparatus)

Figure 13:
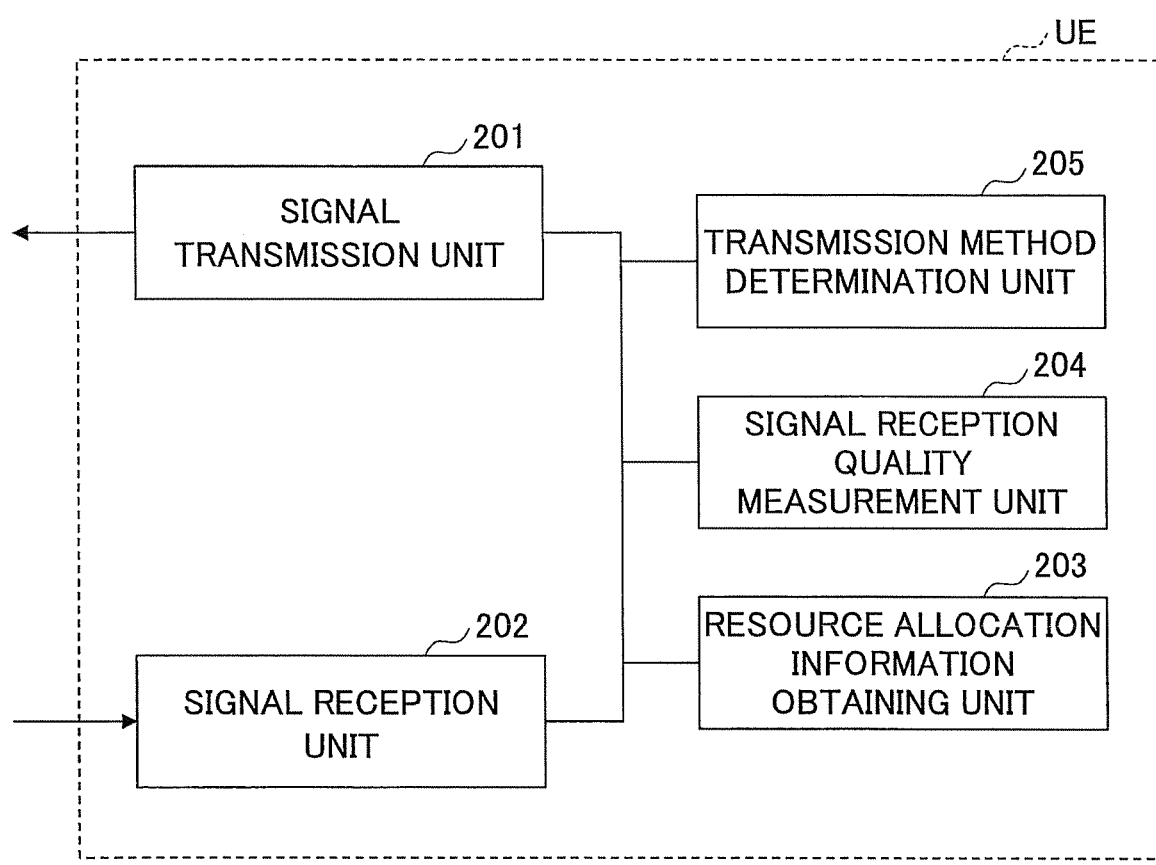
FIG. 13 is a drawing illustrating an example of a functional structure of a user apparatus according to an embodiment.

FIG. 13 is a drawing illustrating an example of a functional structure of a user apparatus UE according to an embodiment. As illustrated in FIG. 13, the user apparatus UE includes a signal transmission unit 201, a signal reception unit 202, a resource allocation information obtaining unit 203, a signal reception quality measurement unit 204, and a transmission method determination unit 205. It should be noted that FIG. 13 illustrates functional units of the user apparatus UE especially related to an embodiment only, and thus, the user apparatus UE further includes at least functions for performing operations according to LTE (not shown in the figure). Further, a functional structure illustrated in FIG. 13 is only an example. Functional classification and names of functional units may be anything as long as operations related to an embodiment can be performed.

The signal transmission unit 201 includes a function for wirelessly transmitting various kinds of physical layer signals generated from an upper layer signal which should be transmitted from the user apparatus UE. Further, the signal transmission unit 201 transmits an uplink signal to the base station eNB by using a radio resource used for uplink signal transmission determined by the transmission method determination unit 205. Further, the signal transmission unit 201 may transmit an uplink signal to the base station eNB according to transmission power determined by the transmission method determination unit 205.

The signal reception unit 202 includes a function for wirelessly receiving various kinds of signals from the base station eNB, and obtaining upper layer signals from the received physical layer signals.

The resource allocation information obtaining unit 203 obtains resource allocation information from the base station eNB via the signal reception unit 202. Further, the resource allocation information obtaining unit 203 stores the obtained resource allocation information in a storage unit (memory).

The signal reception quality measurement unit 204 measures signal reception quality of a downlink signal received from the base station eNB. It should be noted that the signal reception quality measured by the signal reception quality measurement unit 204 may be downlink reference signal's path-loss, RSRQ, RSRP, RSRI, or CQI.

The transmission method determination unit 205 determines a radio resource used for uplink signal transmission by comparing the resource allocation information obtained by the resource allocation information obtaining unit 203 with the downlink signal reception quality measured by the signal reception quality measurement unit 204. Further, the transmission method determination unit 205 determines transmission power for transmitting an uplink signal by using the determined radio resource based on the resource allocation information. Further, the transmission method determination unit 205 may determine the transmission power by using the transmission power included in the resource allocation information, or may determine the transmission power according to a predetermined formula.

<Hardware Configuration>

Block diagrams (FIG. 12 and FIG. 13) used for describing an embodiment indicate functional unit blocks. These functional blocks (functional units) are realized by an arbitrary combination of hardware and/or software. Further, realizing means of the functional blocks is not specifically limited. In other words, each functional block may be realized by a physically and/or logically coupled single apparatus, or may be realized by multiple apparatuses which are physically and/or logically separated and directly and/or indirectly connected (for example, with a wire and/or wirelessly).

Figure 14:
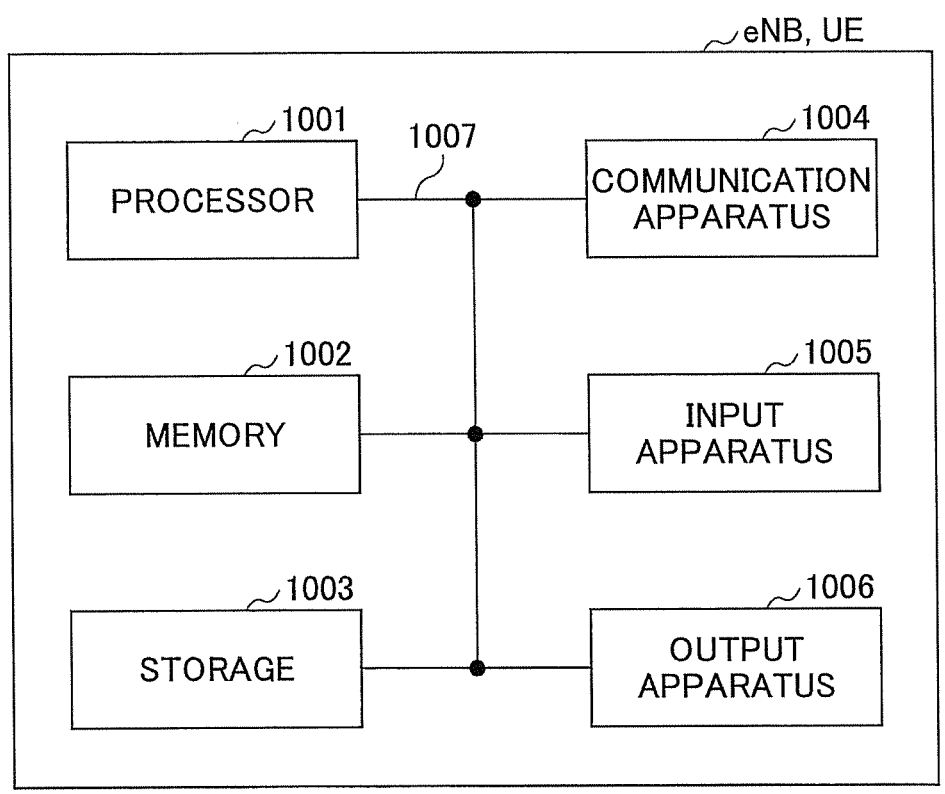
FIG. 14 is a drawing illustrating an example of a hardware configuration of both a base station and a user apparatus according to an embodiment.

For example, the base station eNB and the user apparatus UE according to an embodiment may be realized as computers performing processes of a wireless communication method of the present invention. FIG. 14 is a drawing illustrating an example of a hardware configuration of both a base station eNB and a user apparatus UE according to an embodiment. The above-described base station eNB and the user apparatus UE may be physically realized by computer apparatuses including a processor 1001, a memory 1002, a storage 1003, a communication apparatus 1004, an input apparatus 1005, an output apparatus 1006, a bus 1007, etc.

It should be noted that the term "apparatus" in the following description may be read as a circuit, a device, a unit, etc. The hardware configurations of the base station eNB and the user apparatus UE may include one or more apparatuses illustrated in the drawing, or may not include some of the apparatuses.

Functions of the base station eNB and the user apparatus UE are realized by having predetermined software (program) read to hardware such as the processor 1001, the memory 1002, etc., by having the processor 1001 perform calculation, and by having the processor 1001 control communications by the communication apparatus 1004 and data reading and writing to and from the memory 1002 and the storage 1003.

The processor 1001 controls the entire computer by, for example, processing the operating system. The processor 1001 may be a Central Processing Unit (CPU) including an interface with a peripheral apparatus, a control apparatus, a calculation apparatus, a register, etc. For example, the signal transmission unit 101, the signal reception unit 102, and the resource allocation control unit 103 of the base station eNB, and, the signal transmission unit 201, the signal reception unit 202, the resource allocation information obtaining unit 203, the signal reception quality measurement unit 204, and the transmission method determination unit 205 of the user apparatus UE may be realized by the processors 1001.

Further, the processor 1001 reads programs (program codes), software modules, or data from the storage 1003 and/or the communication apparatus 1004 into the memory 1002, and performs various processes according to the read programs, software modules, or data. The programs are used for causing the computer to perform at least some of the operations described in the above-described embodiments. For example, the signal transmission unit 101, the signal reception unit 102, and the resource allocation control unit 103 of the base station eNB, and, the signal transmission unit 201, the signal reception unit 202, the resource allocation information obtaining unit 203, the signal reception quality measurement unit 204, and the transmission method determination unit 205 of the user apparatus UE may be realized by control programs that are stored in the memory 1002 and executed by the processor 1001, and other functional blocks may be realized in the similar way. The above processes are described as performed by a single processor 1001. However, the processes may be performed simultaneously or sequentially by two or more processors 1001. The processor 1001 may be implemented by one or more chips. It should be noted that the programs may be transmitted from a network via telecommunication lines.

The memory 1002 is a computer-readable recording medium, and may include, for example, at least one of a Read Only Memory (ROM), an Erasable Programmable ROM (EPROM), an Electrically Erasable Programmable ROM (EEPROM), a Random Access Memory (RAM), etc. The memory 1002 may be referred to as a register, a cache, a main memory, etc. The memory 1002 can store programs (program codes), software modules, etc., executable for performing communication methods according to an embodiment.

The storage 1003 is a computer-readable recording medium, and may include at least one of an optical disk including a Compact Disc ROM (CD-ROM), a hard disk drive, a flexible disk, a magneto optical disk (e.g., a compact disk, a digital versatile disk, a Blu-ray (registered trademark) disk), a smart card, a flash memory (e.g., a card, a stick, a key drive), a floppy (registered trademark) disk, a magnetic strip, etc. The storage 1003 may be referred to as an auxiliary storage apparatus. The above-described recording medium may be a database, a server, or any other appropriate medium including the memory 1002 and/or the storage 1003.

The communication apparatus 1004 is hardware (transmitting and receiving device) for performing communications between computers via a wired network and/or a wireless network, and may be referred to as, for example, a network device, a network controller, a network card, a communication module, etc. For example, the signal transmission unit 101 and the signal reception unit 102 of the base station eNB, and, the signal transmission unit 201 and the signal reception unit 202 of the user apparatus UE may be realized by the communication apparatuses 1004.

The input apparatus 1005 is an input device (e.g., a keyboard, a mouse, a microphone, a switch, a button, and a sensor) used for accepting an input from outside. The output apparatus 1006 is an output device (e.g., a display, a speaker, an LED lamp) used for performing an output to outside. It should be noted that the input apparatus 1005 and the output apparatus 1006 may be integrated as a single apparatus (e.g., a touch panel).

Further, apparatuses including the processor 1001 and the memory 1002 are connected to each other by the bus 1007 used for communicating information. The bus 1007 may be a single bus, or may be buses different among the apparatuses.

Further, the base station eNB and the user apparatus UE may include hardware such as a microprocessor, a Digital Signal Processor (DSP), an ASIC (Application Specific Integrated Circuit), a PLD (Programmable Logic Device), and a FPGA (Field Programmable Gate Array), etc. Some or all of the functional blocks may be realized by the above hardware. For example, the processor 1001 may be implemented by at least one of the above hardware.

SUMMARY

As described above, a user apparatus according to an embodiment is provided. The user apparatus communicates with a base station in a wireless communication system. The user apparatus includes an obtaining unit configured to obtain resource allocation information in which downlink signal reception quality is associated with radio resources used for uplink signal transmission; a measurement unit configured to measure the downlink signal reception quality; and a transmission unit configured to determine a radio resource of the radio resources used for uplink signal transmission by comparing the resource allocation information with the measured downlink signal reception quality, and transmit an uplink signal by using the determined radio resource. With the above user apparatus UE, a technology is provided in which it is possible to transmit an uplink signal without receiving uplink radio resource allocation for every uplink signal transmission.

Further, the transmission unit may determine transmission power for transmitting an uplink signal by using the determined radio resource based on the resource allocation information, and transmit the uplink signal according to the determined transmission power. With the above arrangement, in a wireless communication system according to an embodiment, it is possible to multiplex uplink signals from multiple user apparatuses UE into a predetermined uplink radio resource in the power domain, and it is possible for the base station eNB to separate the uplink signals according to the Multi-user Detection processing. Further, with the above arrangement, it is possible to increase frequency utilization efficiency of uplink radio resources.

Further, in the resource allocation information, the downlink signal reception quality may be associated with radio resources used for uplink signal transmission and information indicating transmission power, and the transmission unit may determine, by using the information indicating the transmission power, the transmission power for transmitting an uplink signal by using the determined radio resource. With the above arrangement, it is possible for the user apparatus to determine the transmission power by referring to the resource allocation information, and thus, processing load for determining transmission power is reduced.

It should be noted that the downlink signal reception quality may be reference signal's path-loss, RSRQ, RSRP, RSRI, or CQI. With the above arrangement, in the wireless communication system according to an embodiment, it is possible to perform uplink radio resource allocation by using the signal reception quality measured by using various methods.

Further, as described above, a base station according to an embodiment is provided. The base station communicates with a user apparatus in a wireless communication system. The base station includes a transmission unit configured to transmit resource allocation information in which downlink signal reception quality is associated with radio resources used for uplink signal transmission; and a reception unit configured to receive an uplink signal transmitted by the user apparatus by using a predetermined radio resource of the radio resources. With the above base station eNB, a technology is provided in which it is possible to transmit an uplink signal without receiving uplink radio resource allocation for every uplink signal transmission.

Further, in the case where uplink signals from multiple user apparatuses are multiplexed in the predetermined radio resource, each of the uplink signals transmitted from the multiple user apparatuses may be decoded according to the Multi-user Detection processing. With the above arrangement, in a wireless communication system according to an embodiment, it is possible to multiplex uplink signals from multiple user apparatuses UE into a predetermined uplink radio resource in the power domain, and it is possible for the base station eNB to separate the uplink signals according to the Multi-user Detection processing. Further, with the above arrangement, it is possible to increase frequency utilization efficiency of uplink radio resources.

Further, the base station includes a control unit configured to control radio resources used for uplink signal transmission by changing the resource allocation information based on the traffic status in the base station, and the transmission unit may transmit the changed resource allocation information. With the above arrangement, it is possible to distribute the radio resources used for uplink signal transmission according to a degree of congestion (traffic status) of uplink radio resources in the base station eNB, and thus, it is possible to increase uplink signal communication probability (to reduce collision probability of uplink signals transmitted by multiple user apparatuses UE).

Further, the signal transmission unit may transmit the resource allocation information to the user apparatus by using broadcast information or an RRC signal. With the above arrangement, it is possible for the base station eNB to transmit the resource allocation information to the user apparatus UE by using various methods.

Further, as described above, a communication method according to an embodiment is provided. The communication method is performed by a user apparatus that communicates with a base station in a wireless communication system. The communication method includes obtaining resource allocation information in which downlink signal reception quality is associated with radio resources used for uplink signal transmission; measuring the downlink signal reception quality; determining a radio resource of the radio resources used for uplink signal transmission by comparing the resource allocation information with the measured downlink signal reception quality; and transmitting an uplink signal by using the determined radio resource. With the above communication method, in the case of transmitting an uplink signal, a technology is provided in which it is possible to transmit an uplink signal without receiving uplink radio resource allocation for every uplink signal transmission.

Further, as described above, a communication method according to an embodiment is provided. The communication method is performed by a base station that communicates with a user apparatus in a wireless communication system. The communication method includes transmitting resource allocation information in which downlink signal reception quality is associated with radio resources used for uplink signal transmission; and receiving an uplink signal transmitted by the user apparatus by using a predetermined radio resource of the radio resources. With the above communication method, in the case of transmitting an uplink signal, a technology is provided in which it is possible to transmit an uplink signal without receiving uplink radio resource allocation for every uplink signal transmission.

Supplementary Description of Embodiment

In the above-described embodiments, the RRC signal may be an RRC message.

The above-described embodiments may be enhanced to be used in a system that uses LTE (Long Term Evolution), LTE-A (LTE-Advanced), CDMA2000, UMB (Ultra Mobile Broadband), IEEE802.11 (Wi-Fi (registered trade mark)), IEEE802.16 (WiMAX (registered trade mark)), IEEE802.20, UWB (Ultra-Wideband), Bluetooth (registered trade mark), and/or other appropriate schemes.

Information and a signal used in the above-described embodiments may be represented by using any one of various different technologies. For example, data, instruction, command, information, signal, bit, symbol, and chip may be represented by voltage, current, electromagnetic waves, magnetic fields or magnetic particles, optical fields or photon, or any combination thereof.

The above-described apparatuses (user apparatus UE/base station eNB) according to an embodiment may include a CPU and a memory, may be realized by having a program executed by the CPU (processor), may be realized by hardware such as hardware circuitry in which the logic described in an embodiment is included, or may be realized by a mixture of a program and hardware.

As described above, embodiments have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. The order of steps in the above described sequences and flowcharts according to an embodiment may be changed as long as there is no contradiction. For the sake of description convenience, the user apparatus UE and the base station eNB have been described by using functional block diagrams. These apparatuses may be implemented by hardware, by software, or by combination of both. The software which is executed by a processor included in a user apparatus UE according to an embodiment and the software which is executed by a processor included in a base station eNB may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

Software or instructions in an embodiment may also be transmitted via transmission medium. For example, in the case where the software is transmitted from a web site, a server, or other remote sources by using a coaxial cable, optical fiber cable, twisted pair, digital subscriber line (DSL), or wireless technologies such as infrared, radio, microwaves, etc., the coaxial cable, optical fiber cable, twist pair, DSL, or wireless technologies such as infrared, radio, microwaves, etc., are included in the definition of the transmission medium.

The present invention is not limited to the above embodiments and various variations, modifications, alternatives, replacements, etc., may be included in the present invention without departing from the spirit of the invention.

It should be noted that the resource allocation information obtaining unit 203 is an example of an obtaining unit according to an embodiment. The signal reception quality measurement unit 204 is an example of a measurement unit. The signal transmission unit 201 and the transmission method determination unit 205 is an example of a transmission unit.

Further, the signal transmission unit 101 is an example of a transmission unit. The signal reception unit 102 is an example of a reception unit. The resource allocation control unit 103 is an example of a control unit.

The present application is based on and claims the benefit of priority of Japanese Priority Application No. 2015-126717 filed on Jun. 24, 2015, the entire contents of which are hereby incorporated by reference.

DESCRIPTION OF THE REFERENCE NUMERALS eNB Base station
UE User apparatus
101 Signal transmission unit
102 Signal reception unit
103 Resource allocation control unit
112 MUD processing unit
201 Signal transmission unit
202 Signal reception unit
203 Resource allocation information obtaining unit
204 Signal reception quality measurement unit
205 Transmission method determination unit
1001 Processor
1002 Memory
1003 Storage
1004 Communication apparatus 1005 Input apparatus
1006 Output apparatus

What is claimed is:

1. A user apparatus that communicates with a base station in a mobile communication system, the user apparatus comprising:
   a receiver that receives resource allocation information that comprises a table that specifies uplink radio resources that correspond to downlink signal reception qualities;
   a processor that measures the downlink signal reception quality; and
   a transmitter that determines a radio resource among the uplink radio resources specified in the table by comparing the measured downlink signal reception quality with the downlink signal reception qualities specified in the table, and transmits an uplink signal by using the determined radio resource.

2. The user apparatus according to claim 1, wherein, the transmitter determines transmission power for the uplink signal transmission by using the determined radio resource based on the resource allocation information, and transmits the uplink signal according to the determined transmission power.

3. The user apparatus according to claim 2, wherein, in the resource allocation information, the downlink signal reception qualities include information indicating the transmission power, and
   the transmitter determines, by using the information indicating the transmission power, the transmission power for the uplink signal transmission by using the determined radio resource.

4. A base station that communicates with a user apparatus in a mobile communication system, the base station comprising:
   a transmitter that transmits resource allocation information that comprises a table that specifies uplink radio resources that correspond to downlink signal reception qualities; and
   a receiver that receives an uplink signal transmitted from the user apparatus by using a predetermined radio resource of the radio resources,
   wherein the predetermined radio resource is determined among the uplink radio resources specified in the table by comparing a measured downlink signal reception quality with the downlink signal reception qualities specified in the table.

5. The base station according to claim 4, wherein, in the case where uplink signals from multiple user apparatuses are multiplexed in the predetermined radio resource, the receiver decodes each of the uplink signals transmitted from the multiple user apparatuses according to Multi-user Detection processing.

6. The base station according to claim 4, further comprising:
   a processor that controls the radio resources used for uplink signal transmission by changing the resource allocation information based on a traffic status in the base station, wherein
   the transmitter transmits the changed resource allocation information.

7. The base station according to claim 5, further comprising:
   a processor that controls the radio resources used for uplink signal transmission by changing the resource allocation information based on a traffic status in the base station,
   wherein the transmitter transmits the changed resource allocation information.

8. A communication method performed by a user apparatus that communicates with a base station in a mobile communication system, the communication method comprising:
   receiving resource allocation information that comprises a table that specifies uplink radio resources that correspond to downlink signal reception qualities;
   measuring the downlink signal reception quality;
   determining a radio resource among the uplink radio resources specified in the table by comparing the measured downlink signal reception quality with the downlink signal reception qualities specified in the table; and
   transmitting an uplink signal by using the determined radio resource.

9. A communication method performed by a base station that communicates with a user apparatus in a mobile communication system, the communication method comprising:
   transmitting resource allocation information that comprises a table that specifies uplink radio resources that correspond to downlink signal reception qualities; and
   receiving an uplink signal transmitted from the user apparatus by using a predetermined radio resource of the radio resources,
   wherein the predetermined radio resource is determined among the uplink radio resources specified in the table by comparing a measured downlink signal reception quality with the downlink signal reception qualities specified in the table.

* * * * *